United States Patent Office 3,491,008
Patented Jan. 20, 1970

3,491,008
FREE RADICAL ADDITIONS OF ALCOHOLS AND AMINES TO OLEFINS EMPLOYING A BASIC CATALYST WITH ULTRA VIOLET LIGHT
Charles David Broaddus, Springfield Township, Hamilton County, Ohio, assignor to The Procter & Gamble Company, Cincinnati, Ohio, a corporation of Ohio
No Drawing. Filed Mar. 16, 1967, Ser. No. 623,556
Int. Cl. C07c 3/24; B01j 1/10
U.S. Cl. 204—162    9 Claims

ABSTRACT OF THE DISCLOSURE

A process for adding secondary alcohols and secondary alkyl primary amines to olefins under free radical conditions according to the equation,

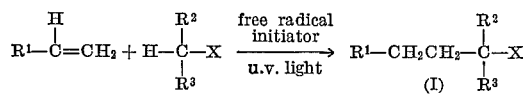

($R^1$, $R^2$, and $R^3$ = alkyl groups, X = —OH or —$NH_2$) the process being conducted in the presence of a strong base to increase the proportionate yield of the 1:1 addition product, I, produced.

---

This invention relates to an improved process for adding alcohols and amines to olefins under free radical conditions.

In particular, this invention relates to an improvement in the process of free radical addition of secondary alcohols and secondary alkyl primary amines of the formula

wherein $R^2$ and $R^3$ are alkyl groups containing from 1 to about 10 carbon atoms, and X is a group selected from groups consisting of hydroxyl [—OH] and amino [—$NH_2$] groups, to olefins of the formula

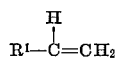

wherein $R^1$ is an alkyl group containing from about 4 to about 18 carbon atoms.

The addition reaction which occurs in this process can be represented in part by Equation 1:

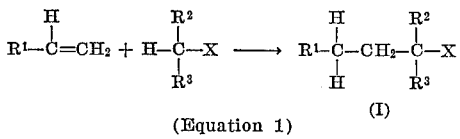

(Equation 1)

The compound labeled I in this equation is referred to hereinafter as the 1:1 addition compound. A similar free radical addition process is discussed in the following published articles: (1) W. H. Urry et al., Journal of the American Chemical Society, vol. 74, page 6155 (1952); (2) W. H. Urry, et al., Journal of the American Chemical Society, vol 25, page 250 (1954); and (3) W. H. Urry et al., Journal of the American Chemical Society, vol. 76, page 450 (1954).

The free radical addition of alcohols and amines to olefins (as represented by Equation 1) can be a useful process for obtaining certain tertiary alcohols and tertiary alkyl primary amines, namely, the 1:1 addition compound labeled I in Equation 1 above. This process, however, can lead to the formation of telomers, i.e., addition compounds as reaction products which contain 2:1, 3:1, and higher whole number ratios of olefin to the alcohol or amine reactant, along with the 1:1 addition compound. In the prior art processes, such as those mentioned above, these telomers represent a major proportion of the reaction product. These telomers are high molecular weight polymeric materials, and generally are not the desired product. Usually, it is the 1:1 addition compound that is the desired product.

While the nature of the free radical mechanism of this process is uncertain, the following proposed mechanism will indicate the nature of this problem.

It is suggested that the alcohol or amine reactant

reacts with a suitable free radical initiator and is itself converted to a free radical, thus,

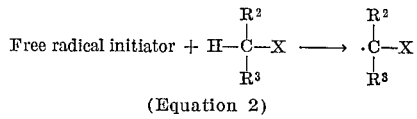

(Equation 2)

and that this free radical adds on olefin, as in Equation 3,

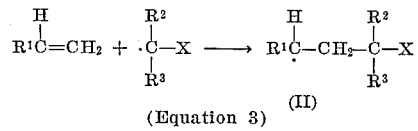

(Equation 3)

This new free radical II, the addition product formed, can abstract a hydrogen radical from the alcohol or amine being reacted terminating the free radical chain and forming the 1:1 addition compound I as indicated in Equation 4:

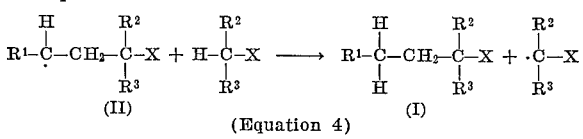

(Equation 4)

or alternatively, the free radical II can react instead with another olefin molecule forming a 2:1 addition compound, as indicated in Equation 5,

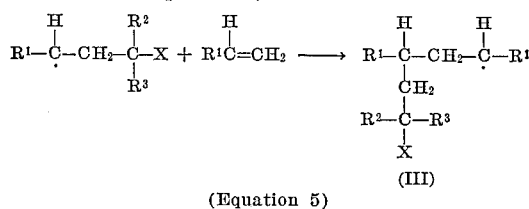

(Equation 5)

This new free radical addition compound III can react further with yet another olefin molecule forming the 3:1 addition compound, or the chain can be terminated by the abstraction of a hydrogen as in Equation 4. In this way 2:1, 3:1 and higher telomers are formed along with the 1:1 addition compound.

To increase the proportionate yield of the 1:1 addition compound, the prior art teaches that high concentrations of the alcohol or amine reactant should be used. This favors the process represented by Equation 4 for the free radical addition product II would have less chance of reacting with another olefin molecule. This expedient, however, is only marginally successful.

It is the object of this invention to improve the process of the above-mentioned free radical addition of alcohols and amines to olefins by markedly increasing the proportionate yield of the 1:1 addition compound (compound I in Equation 4) and correspondingly decreasing the proportionate yield of undesired polymeric telomers.

It has been surprisingly found that the addition of a strong base to the reaction mixture of an alcohol or amine and an olefin being reacted under free radical conditions substantially and unexpectedly decreases the proportionate yield of telomeric products formed, and substantially increases the proportionate yield of the 1:1 addition compound formed.

The process of this invention for adding olefins to alcohols and amines under free radical conditions requires a suitable free radical initiator and is ultraviolet light induced. The free radical initiator must be sufficiently active to be decomposed freely into free radicals by the action of ultraviolet light under the reaction conditions used. An initiator is required which is capable of depriving the alcohol or amine reactant of its labile or active hydrogen, and starting the series of reactions. The process is conducted in a suitable container which permits irradiation of the reaction mixture with ultraviolet light. If a wall of the container is interposed between the ultraviolet light radiation source and the reactants, the cell wall should be composed of a material which does not unduly hinder the transmission of the ultraviolet radiation. Many such materials which do not unduly hinder the transmission of ultraviolet radiation are known in the art. An especially preferred example is quartz. Any suitable source of ultraviolet radiation can be used; a mercury vapor lamp is an especially suitable source of ultraviolet radiation. Sunlight is another source of ultraviolet radiation.

The suitable alcohols and amines useful in the process of this invention are hereinbefore specified as secondary alcohols and secondary alkyl primary amines of the formula

wherein $R^2$ and $R^3$ are alkyl groups containing from 1 to about 10 carbon atoms, and X is selected from the group consisting of hydroxyl [—OH] and amino [—NH$_2$] groups. Preferred are the above-mentioned secondary alcohols and secondary alkyl amines where $R^2$ and $R^3$ are alkyl groups containing from 1 to about 5 carbon atoms. Examples of suitable alcohols and amines are 2-propanol, 2-butanol, 3-methyl-2-butanol, 2-pentanol, 3-pentanol, 2-hexanol, 3-hexanol, 7-hexadecanol, 2-aminopropane, 2-aminobutane, 3-methyl-2-aminobutane, 2-aminopentane, 3-aminopentane, 2-aminohexane, 3-aminohexane, 4-aminodecane, and 6-aminooctadecane. Especially preferred are 2-propanol and 2-aminopropane.

The suitable olefins useful in the process of this invention are hereinbefore specified as olefins of the formula

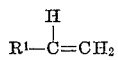

wherein $R^1$ is an alkyl group containing from about 4 to about 18 carbon atoms. Preferred are the above-mentioned olefins containing from about 6 to about 12 carbon atoms. Examples of such olefins are 1-hexene, 1-heptene, 1-octene, 1-nonene, 1-decene, 1-undecene, 1-dodecene, 1-tridecene, 1-tetradecene, 1-hexadecene, and 1-eicosene. Especially preferred is 1-dodecene. Other olefins containing from about 6 to about 20 carbon atoms with internal unsaturation and multiple points of unsaturation can be useful in the process of this invention.

An excess of the alcohol or amine relative to the olefin being reacted should be employed in the process. A suitable excess is provided by forming a reaction mixture with from about 2 to about 50 parts, on a mole basis, of the alcohol or amine reactant to each part of olefin. Preferably, the reaction mixture contains from about 10 to about 30 parts, on a mole basis, of the alcohol or amine reactant to each part of olefin.

A suitable free radical initiator is required in the process. Suitable free radical initiators are di-t-butyl peroxide, di-t-amyl peroxide, and 2,2-bis-(t-butylperoxy)-butane. A preferred free radical initiator is di-t-butyl peroxide. Other free radical initiators which are compatible with the reaction mixture of this process can be useful. An amount of free radical initiator should be employed such that there is from about .0001 mole to about .1 mole, from about .001 mole to about .01 mole being preferred, of the free radical initiator present to each mole of the alcohol or amine reactant.

It is critical that a strong base be employed in the process of this invention. To be useful in the process of this invention, the base employed must be sufficiently strong to give the alcoholate or amide of the alcohol or amine reactant in the process, i.e., the alcoholate

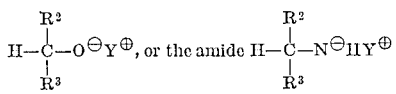

(wherein $Y^\oplus$ is a cation, for example, Li$^+$, Na$^+$, and K$^+$).

The lithium, sodium and potassium alcoholates, or the lithium, sodium and potassium amides of the alcohol or amine being reacted are themselves especially suitable bases to employ in the process of this invention. Such bases would include, for example, sodium 2-propoxide, potassium 2-proproxide, sodium 2-butoxide, etc. Other especially suitable bases are bases stronger than the lithium, sodium and potassium alcoholates and amides of the alcohol or amine reactants. When added to the reaction mixture stronger bases will, of course, react with the alcohol or amine reactant to give an alcoholate or amide. Preferred examples of such stronger bases are lithium, sodium and potassium t-butoxide.

The concentration of base employed should be as high as possible. The highest useful concentration of base in the solution, however, is limited by the solubility of the alcoholate or amide formed. Even very small amounts of base are useful. It has been found that an especially useful concentration of base is provided if the alcohol or amine reactant solution is from about .2 to about 1.2 molar with respect to the base.

The process of this invention is conducted by forming a reaction mixture by mixing together the above-mentioned alcohol or amine reactant, a quantity of base, the olefin reactant, and free radical initiator. This mixture is then irradiated with ultraviolet light for from about .5 to about 50 hours, and preferably for from about 2 to about 10 hours.

It is preferable, though not absolutely necessary, that oxygen be excluded from the reaction process. Oxygen can be conveniently excluded from the reaction process by bubbling nitrogen or an inert gas through the reaction mixture and conducting the reaction under the atmosphere of nitrogen or an inert gas. Examples of suitable inert gases are argon and helium.

The temperature of the reaction mixture is not critical. The temperature should be high enough, however, so the reaction mixture is liquid, but not so high that the reaction mixture boils. The limits of this broad temperature range for a specific reaction mixture can be easily determined by those skilled in the art. Generally, temperatures from about 20° C. to about 100° C. are preferred.

While not wishing to be bound by an particular theory of why the addition of a strong base improves the proportionate yield of the 1:1 addition compound in the process of this invention, the data can be interpreted as demonstrating that the alcoholate free radical

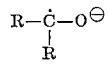

is more stable than the alcohol free radical,

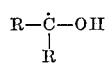

and similarly, that the amide free radical

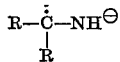

is more stable than the amine free radical

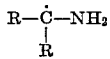

This explains why a base sufficiently strong to form the alcoholates or amide of the alcohol or amine reactant is required. Presumably initiation to give the alcoholate and amide free radicals is easier than initiation to give alcohol and amine free radicals. Hence, Equation 4 above would be favored over Equation 5.

The following specific examples are given to illustrate the process of this invention with particularity, and are not to be construed as limiting.

EXAMPLE I

The process of adding the alcohol, 2-propanol, to the olefin, 1-dodecene, was conducted in the following manner: A basic 2-propanol solution was prepared by dissolving a suitable amount of potassium t-butoxide in 2-propanol. To 2.5 liters of this basic alcoholic solution there was added 168 grams (1 mole) of the olefin 1-dodecene and 10 grams (0.68 mole) of the free radical initiator di-t-butyl-peroxide. The resulting mixture was poured into a quartz container. Nitrogen was bubbled through the mixture and an atmosphere of nitrogen was maintained over the mixture throughout the reaction. The contents of the container were then irradiated with ultraviolet light provided by a 500-watt mercury vapor lamp for a period of 6 hours. The products obtained were separated by distillation. Four runs were made in this manner with varying concentrations of the base potassium t-butoxide. The varying concentrations of base and the yields of addition products are given below.

| | Molar concentration of Potassium t-Butoxide | Grams of 1:1 Addition Compound | Grams of Telomeric Products | Weight Ratio of 1:1 addition compound to Telomeric Products |
|---|---|---|---|---|
| Run: | | | | |
| 1 | 1.2 | 43.4 | 8.2 | 5.3 |
| 2 | 0.4 | 51.0 | 17.0 | 3.0 |
| 3 | 0.2 | 42.0 | 15.0 | 2.8 |
| 4 | 0.0 | 28.0 | 28.0 | 1.0 |

A comparison of these runs shows the substantial improvement in the proportion of 1:1 addition compound attained by employing the strong base t-butoxide in this process. The 1:1 addition compound obtained was the tertiary alcohol, 1,1-dimethyltridecanol-1.

EXAMPLE 2

When in Example 1, the base potassium isopropoxide (potassium 2-propoxide) is substituted for the base potassium t-butoxide, substantially the same results are obtained in that the proportion of the 1:1 addition compound obtained, 1,1-dimethyltridecanol-1, is substantially improved by the addition of the base potassium isopropoxide.

EXAMPLE 3

When in Example 1, the base sodium isopropoxide (sodium 2-propoxide) is substituted for potassium t-butoxide, substantially the same results are obtained in that the proportion of the 1:1 addition compound obtained, 1,1-dimethyltridecanol-1, is substantially improved by the addition of base sodium isopropoxide.

EXAMPLE 4

When in Example 1, the base lithium isopropoxide (lithium 2-propoxide) is substituted for potassium t-butoxide, substantially the same results are obtained in that the proportion of the 1:1 addition compound obtained, 1,1-dimethyltridecanol-1, is substantially improved by the addition of the base lithium isopropoxide.

EXAMPLE 5

When in Example 1, the olefin 1-octene is substituted for 1-dodecene, substantially the same results are obtained in that the proportion of the 1:1 addition compound formed is substantially improved by the presence of the base. The 1:1 addition compound formed in this instance is 1,1-dimethylnonanol-1.

EXAMPLE 6

When in Example 1, the alcohol 3-hexanol is substituted for 2-propanol, substantially the same results are obtained in that the proportion of the 1:1 addition compound formed is substantially improved by the presence of the base. The 1:1 addition compound formed in this instance is 1-ethyl-1-propyltridecanol-1.

EXAMPLE 7

The process of adding the amine, 2-aminopropane, to the olefin, 1-dodecene, was conducted in the following manner: A basic 2-aminopropane solution was prepared by dissolving a suitable amount of potassium t-butoxide in 2-aminopropane. To 180 ml. of this basic amine solution there was added 16.8 g. (0.1 mole) of 1-dodecene and 2 g. (.014 mole) of the free radical initiator di-t-butyl peroxide. The resulting mixture was poured into a quartz container. Nitrogen was bubbled through the mixture and an atmosphere of nitrogen was maintained over the mixture throughout the reaction. The contents of the container were then irradiated with ultraviolet light provided by a 500-watt mercury vapor lamp for a period of 4 hours. The products obtained were separated by distillation. Two runs were made in this manner. The base potassium t-butoxide was present in one run; no base was present in the other run. The yield of addition products in each run is shown below:

| | Molar concentration of Potassium t-Butoxide | Grams of 1:1 Addition Compound | Grams of Telomeric Products | Weight Ratio of 1:1 addition compound to Telomeric Products |
|---|---|---|---|---|
| Run: | | | | |
| 1 | 0.28 | 4.8 | 1.7 | 2.8 |
| 2 | 0.0 | 0.7 | 0.9 | .77 |

A comparison of these runs shows the substantial improvement in the proportion of 1:1 addition attained by employing the strong base t-butoxide in this process. The 1:1 addition compound obtained was the tertiary alkyl primary amine 1,1-dimethyl-1-aminotridecane.

EXAMPLE 8

When in Example 7, the olefin 1-hexene is substituted for 1-dodecene, substantially the same results are obtained in that the proportion of the 1:1 addition product obtained is substantially improved by the addition of the base. The 1:1 addition compound obtained in this instance is 1,1-dimethyl-1-aminoheptane.

EXAMPLE 9

When in Example 7, the amine 3-aminopentane is substituted for 3-aminopropane, substantially the same results are obtained in that the proportion of the 1:1 addition product obtained is substantially improved by the addition of the base. The 1:1 addition product obtained in this instance is 1,1-diethyl-1-aminotridecane.

The tertiary alcohols produced in the process disclosed herein have many valuable uses. For example, tertiary alcohols of the formula

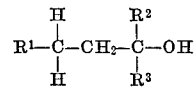

for example, 1,1-dimethyltridecanol-1, can be reacted with $H_2SO_4$, CO, and $H_2O$ in what is known in the art as the Koch reaction to obtain tertiary monocarboxylic acids of the formula

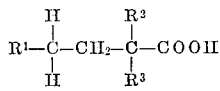

as for example, 1,1-dimethyltridecanoic acid. In U.S. Patents 3,067,220; 3,067,221 and 3,097,218, such acids are disclosed to be essential starting materials in processes disclosed therein for obtaining useful surface active agents.

Likewise, the tertiary alkyl primary amines produced in the process disclosed herein have many valuable uses. Tertiary alkyl primary amines are sold under the trade name "Primene" by the Rohm & Haas Company. Specific uses are disclosed in the literature of that company. These uses include the use of these compounds as anti-foaming agents, fuel oil additives, corrosion inhibitors, and bactericides. In addition, the tertiary alkyl primary amines produced in the process of this invention are especially useful as intermediates for obtaining certain quaternary amines by reaction with methyl iodide in an alkaline medium, thus,

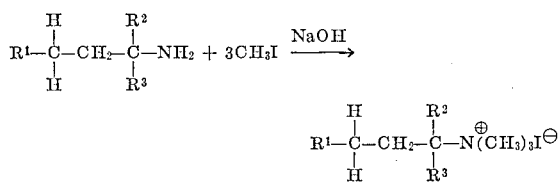

These quaternary amines can be useful fabric softeners and germicides.

What is claimed is:
1. An improved process for adding secondary alcohols and secondary alkyl primary amines to olefins under free radical conditions comprising:
   (I) forming a reaction mixture by mixing together:
      (i) from about 2 to about 50 parts of a compound of the formula

wherein $R^2$ and $R^3$ are alkyl groups containing from about 1 to about 10 carbon atoms and X is a group selected from the groups consisting of hydroxyl [—OH] and amino [—$NH_2$] groups,
      (ii) a quantity of base, said base being sufficiently strong to from alcoholates and amides of the compounds specified in (i) above,
      (iii) from about 0.0001 to about 0.1 parts of a free radical initiator to each part of the compounds specified in (i) above, wherein said free radical initiator is selected from the group consisting of di-t-butyl proxide, di-t-amyl peroxide, and 2,2-bis-(t-butylperoxy)-butane,
      (iv) about 1 part of an olefin of the formula $R^1CH=CH_2$, wherein $R^1$ is an alkyl group containing from about 4 to about 16 carbon atoms, all parts being on a mole basis; and
   (II) irradiating said reaction mixture for a period of from about .5 to about 50 hours with ultraviolet light.

2. The process of claim 1, wherein the base is selected from the group of bases consisting of potassium, sodium, and lithium t-butoxides.

3. The process of claim 1, wherein the reaction mixture formed contains from about 2 to about 50 parts of a compound of the formula

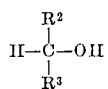

wherein $R^2$ and $R^3$ are alkyl groups containing from about 1 to about 10 carbon atoms.

4. The process of claim 3, wherein the mixture formed contains a base selected from the group of bases consisting of alcoholates of the formula

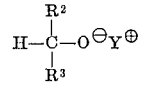

wherein $R^2$ and $R^3$ are alkyl groups containing from about 1 to about 10 carbon atoms, and Y is selected from the group consisting of potassium, sodium, and lithium.

5. The process of claim 1, wherein the mixture formed contains from about 2 to about 50 parts of a compound of the formula

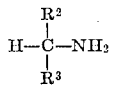

wherein $R^2$ and $R^3$ are alkyl groups containing from about 1 to about 10 carbon atoms.

6. The process of claim 5, wherein the mixture formed contains a base selected from the group of bases consisting of the amides of formula

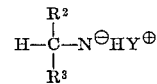

wherein $R^2$ and $R^3$ are alkyl groups containing from about 1 to about 10 carbon atoms, and Y is selected from the group consisting of potassium, sodium, and lithium.

7. The process of claim 1, wherein the mixture formed contains from about 2 to about 50 parts of a compound of the formula

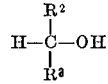

wherein $R^2$ and $R^3$ are alkyl groups containing from about 1 to about 5 carbon atoms.

8. The process of claim 1, wherein the mixture formed contains from about 2 to about 50 parts of a compound of the formula

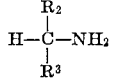

wherein $R^2$ and $R^3$ are alkyl groups containing from about 1 to about 5 carbon atoms.

9. The process of claim 1, wherein the mixture formed contains olefins selected from the group consisting of: 1-hexene; 1-heptene; 1-octene; 1-nonene; 1-decene; 1-dodecene.

References Cited
UNITED STATES PATENTS 2,772,271  11/1956  Urry _____ 204—162

BENJAMIN R. PADGETT, Primary Examiner

U.S. Cl. X.R.

204—158